Figure 4:
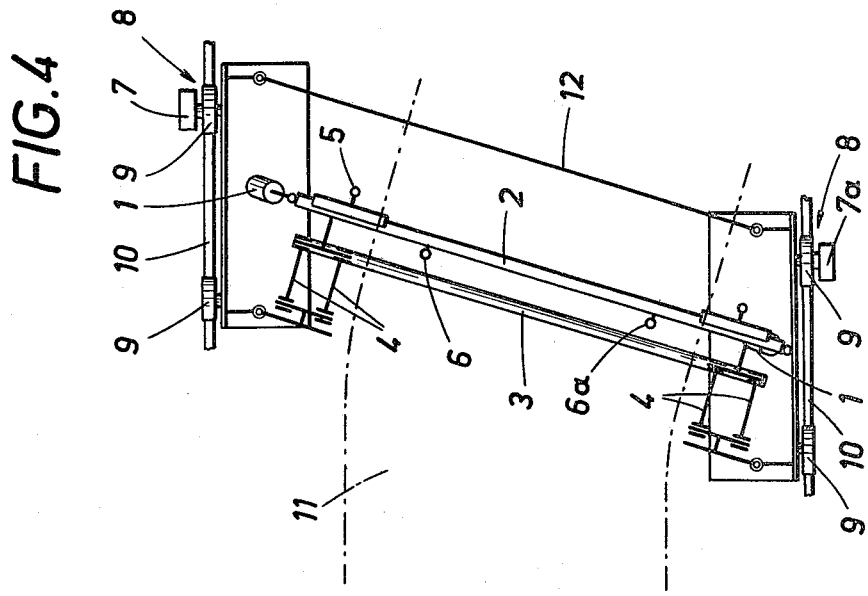

United States Patent [19]

Schoffmann

[11] 3,912,242
[45] Oct. 14, 1975

[54] FLAME CUTTING MACHINE
[76] Inventor: Rudolf Schoffmann, Preglstrasse 8, Linz, Austria
[22] Filed: June 11, 1973
[21] Appl. No.: 369,067

[30] Foreign Application Priority Data
June 20, 1972 Austria ............................. 5285/72

[52] U.S. Cl. .......... 266/23 K; 266/23 K; 266/23 M; 164/263
[51] Int. Cl.² ......................................... B23K 7/10
[58] Field of Search..... 266/23 C, 23 D, 23 E, 23 F, 266/23 HH, 23 K, 23 L, 23 M, 23 N, 23 NN, 23 R; 164/263

[56] References Cited
UNITED STATES PATENTS

| | | | |
|---|---|---|---|
| 1,884,960 | 10/1932 | Anderson | 266/23 D |
| 1,999,853 | 4/1935 | Anderson | 266/23 D |
| 2,161,121 | 6/1939 | Anderson | 266/23 D |
| 2,345,314 | 3/1944 | Anderson | 266/23 N |
| 2,363,036 | 11/1944 | Anderson | 266/23 D |
| 3,339,903 | 9/1967 | Reinfeld et al. | 266/23 HH |
| 3,608,878 | 9/1971 | Dreshman | 266/23 K |
| 3,767,178 | 10/1973 | Pfeuffer et al. | 266/23 K |

FOREIGN PATENTS OR APPLICATIONS

| | | | |
|---|---|---|---|
| 1,496,082 | 1967 | France | 164/263 |
| 1,508,863 | 1969 | Germany | 164/263 |
| 444,084 | 1969 | Japan | 164/263 |

*Primary Examiner*—Granville Y. Custer, Jr.
*Assistant Examiner*—Paul A. Bell

[57] ABSTRACT

The machine serves to transversely sever elongated stock as the same advances in its longitudinal direction substantially on a predetermined path. The machine comprises running gear means which are movable along said path, longitudinal travel drive means which are operable to reciprocate said running gear means along said path, longitudinal travel control means which comprise feeler means adapted to be engaged with the top of said stock and which are adapted to control said longitudinal drive means so as to move said running gear means in the same direction as said stock and in synchronism therewith, a torch-guiding beam which is carried by said running gear means and arranged to move in unison therewith along said path and which extends across said path and is adapted to be raised and lowered, torch means carried by and movable along said beam, and vertical control means which comprise stop means engageable with the top of said stock and which are adapted to hold said beam a predetermined distance above the top of said stock.

3 Claims, 4 Drawing Figures

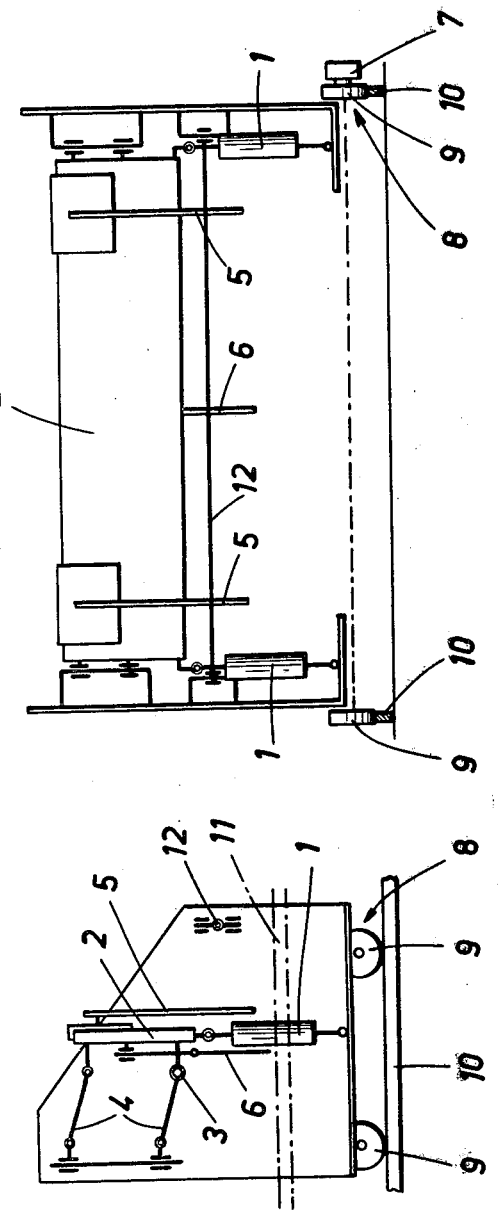

FLAME CUTTING MACHINE

This invention relates to a flame cutting machine for severing moving continuous elongated stock or sheet metal elements or slabs, comprising one or more torches mounted on a transverse guide which, during the cut, moves with the moving stock to be cut and is mounted on a running gear or the like, which is provided with a drive for the return longitudinal travel.

Known flame cutting machines comprise portals provided with a longitudinal travel drive and are guided on rails. One or more torch supports are mounted on the portals and movable thereon transversely to the longitudinal direction of the stock. The cutting torches secured to the supports are vertically adjustable by means of an electric motor and a transmission for adaptation to slabs differing in thickness and for an adjustment of the distance of the torch from the stock.

The portal must be advanced exactly in synchronism with the stock so that a cut at right angles is ensured. Hydraulically operated clamping means are used for this purpose in most cases. In response to the cutting signal delivered by the length-measuring device, the portal is hydraulically-mechanically clamped to the stock. The flame cutting machine then moves in synchronism with the stock. The supports for the torches move toward the edge of the elongated stock and the torches are then lowered by means of the vertical adjusting device so that they are at the proper distance from the top face of the elongated stock. In plants for wide slabs, two torches move in most cases toward the center line. As soon as they meet at the center line, one torch returns to its initial position whereas the second torch completes the cut. Owing to the dimensions of the supports for the torches, the remainder of the cut to be performed has a certain length. When the cut has been completed, the torches are raised and the entire flame cutting machine is returned to its initial position by means of an electromechanical longitudinal travel drive.

Because continuous castings may depart from the ideal position laterally and in height, the clamping means must have corresponding degrees of freedom and are complicated, expensive and heavy. The wear results in the course of time in a backlash at the guides for the clamping mechanism so that the quality and precision of the cut are adversely affected.

Where wider stock, as is produced in plants for the continuous casting of slabs, is to be severed, it is necessary to preset the width to which the clamping mechanism is opened, in order to shorten the clamping time and to increase the precision of cut. This preset width must be changed when slabs having a different width are to be cut.

For this reason, the weight of these machines is considerable, and the return velocities are limited owing to the large masses to be moved.

The stock sometimes tends to assume a saber-shaped lateral curvature. In this case the line of cut would be S-shaped or the clamping mechanism would be subjected to torsional forces which result in an uncontrolled slipping. For this reason, the clamping mechanism is sometimes provided with an additional degree of freedom permitting it to rotate about a vertical axis so that the torch bridge is adjusted at the same time. This will be necessary particularly if the flame cutting machine is spaced a large distance apart from the withdrawal mechanism of the continuous casting plant and if exact cut edges are required, e.g., if the cut slabs are subsequently rolled to thin strip.

Because the portals are guided on a rail, the precision of cut depends also on the straightness of these guide rails, which often have a length of many meters. The tracks are often unilaterally heated by radiation from the hot slabs so that a changing deformation results in operation. To minimize the effects on the precision of cut and to increase the accuracy of the guidance, very elongated portals are used.

It is an object of the present invention to eliminate the disadvantages of the above-mentioned known arrangement and to provide a flame cutting machine which is simpler and more economical.

In a flame cutting machine of the kind defined first hereinbefore, the invention substantially resides in that the transverse guide consisting of a guiding beam is adjustable by the longitudinal drive in the direction of longitudinal travel of the stock to be cut during the cutting operation, at least one control feeler, which is engageable with the top the stock to be cut and preferably consists of a feeler lever, synchronizes the longitudinal drive with the movement of the stock to be cut, the exact distance of the torches from the stock to be cut is adjustable by one or more stops, which are engageable with the top of the stock to be cut and are preferably formed by the feeler lever and which determine the elevation of the guiding beam relative to the stock to be cut, and said guiding beam is upwardly and downwardly adjustable.

In accordance with the invention the previously conventional portal is thus replaced by the guiding beam, which can be raised and lowered preferably by hydraulic means and which during the cut is moved parallel to the top of the stock to be cut. For this reason, the previous need for individual means for vertically adjusting the torches is eliminated and light-weight, small torch carriages may be used.

Figure 3:
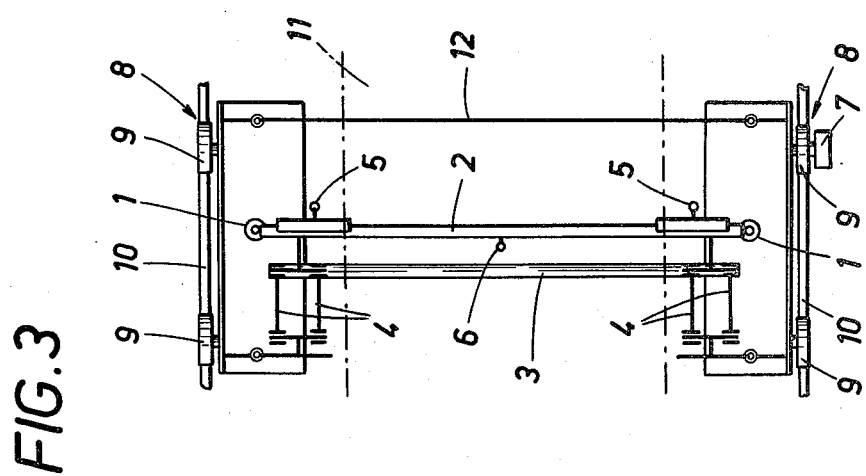

Further details, preferred embodiments and advantages of the subject matter of the invention will become apparent from the subsequent description, in which reference is made to the drawing, in which FIGS. 1 to 3 are a side elevation, front elevation and top plan view, respectively showing highly diagrammatic only the essential, visible parts of a flame cutting machine according to the invention.

FIG. 4 is a view similar to FIG. 3 and shows a modification.

A torch-guiding beam 2 is adapted to be raised and lowered by preferably hydraulic actuators 1, and by means of a synchronizing rod 3 is moved parallel to the top of the elongated stock (slab 11). The beam 2 connected to the rod 3 is held by links 4, which form a parallel motion linkage. Torches 5 are carried by light-weight, small torch carriages, which are transversely movable on the guiding beam 2. The torch-guiding beam 2 is also provided with a control lever 6, which is freely movable in a lateral direction and in the longitudinal direction of the elongated stock. The lateral movement of the control lever 6 has no control function and serves only to prevent a slipping of the control lever if the stock 11 to be cut, e.g., a slab or continuous elongated stock, slowly moves laterally during the cut. The movement of the control lever 6 in the longitudinal direction controls the speed imparted to the entire flame cutting machine by a forward drive 7 which drives running gears 8 disposed at both ends of the guiding beam 2. The running gears carry the beam and have wheels 9 running on rails 10. The forward drive 7 may either be a hydrostatic oil motor or a d.c. motor or a three-phase a.c. motor and be provided with an infinitely adjustable transmission.

Before the cut begins, the machine is in its initial position. The torch-guiding beam 2 and with it the torches 5 and the control lever 6 are raised. In response to a cut-initiating signal delivered, e.g., by a length-measuring device, the torch-guiding beam 2 is lowered by hydraulic actuators 1 until the control lever 6 engages the top of the slab 11. When the slab is moving, the control lever 6 applied thereto is shifted in the longitudinal direction of the slab and as a result initiates and controls the operation of the forward drive 7 so that the machine moves in exact synchronism with the slab 11. The approach of the burner to the stock to be cut and the cutting operation are performed in the conventional manner but the time otherwise required for the vertical adjustment of the torches to the edge of the stock to be cut is saved so that less time is required for a cut.

If the elongated stock, e.g. slab 11, is warped during the cut, lever 6 engaging slab 11 and mounted for vertical guided motion on and with torch-guiding beam 2 will cause the beam to be adjusted accordingly, due to the parallel motion linkage support 4 of the beam, so that torches 5 will always be held exactly at the same distance from the slab. Therefore, there is no longer any need for a clamping device and for separate means for vertically adjusting the torches. Because simpler torch carriages can be used, the torches 5 can very closely approach each other in the middle so that still less time is required for a cut. Because a much smaller mass is to be moved, the longitudinal return movement may be performed at a much higher velocity so that the total time required for a cutting cycle is further reduced. When the cut has been completed, the torch-guiding beam 2 is raised by actuators 1 so that the control lever 6 is released from engagement with slab 11 and is automatically pivotally moved in the longitudinal direction, e.g., by springs, hydraulic actuators, or counterweights, to a position for initiating the longitudinal return travel of the cutting machine. The entire machine thus returns to its initial position without need for further control operations.

As shown in FIGS. 2 to 4, a longitudinal movement is imparted to the machine on both sides thereof by the driven wheels 9. The machine may be short in length so that the total space required for the cutting station is reduced.

The running gears 8 of the cutting machine are interconnected by a parallel motion linkage consisting of connecting cross-member 12 and the guiding beam assembly 2, 3, 4 so that the angular orientation of the torch-guiding beam 2 can be changed in relation to the machine frame and the angular orientation of the running gears may readily follow any curvature of track 10. This angular orientation of the frame and torch-guiding beam 2 with respect to the longitudinal direction of slab 11 facilitates adaptation of the frame and beam if the track curves and/or if the elongated stock 11 exhibits a saber-shaped lateral curvature. In that case, as is indicated in FIG. 4, two control levers 6, 6a may be used, which at transversely spaced points, are engageable with the top of the stock to be cut. In this case, each control lever acts on one of two separate forward drives 7 and 7a, which are provided on respective sides of the flame cutting machine. This enables an automatic pivotal movement of the torch-guiding beam in unison with the movement of the slab so that the cut is made on the line which has been originally selected.

It will be understood that the means for controlling the longitudinal travel and for the vertical adjustment may be used also in shearing machines and other severing means, such as abrasive cut-off machines. The entire system is not restricted to the use in plants for continuous casting.

What is claimed is:

1. In a flame cutting machine for transversely severing elongated stock advancing in a longitudinal direction in a predetermined path, comprising running gear means movable along the predetermined path, drive means operable to move the running gear means along the path, a vertically reciprocable torch-guiding beam extending across the path and carried by the running gear means for movement in unison therewith along the path, torch means carried by, and transversely movable along, the beam to perform a transverse cut through the stock upon vertical downward reciprocation of the beam, and control means for controlling the drive means so as to move the running gear means in the longitudinal direction of the advancement of the stock and in synchronism therewith, the control means comprising a feeler means carried by the beam for free movement in the longitudinal direction and engaging the top of the stock upon downward reciprocation of the beam to synchronize the movements of the running gears with the advancement of the stock, the improvement of the feeler means being mounted on the beam for free movement in a direction transverse to the longitudinal direction, and a positive parallel motion guide supporting the beam and feeler means for common vertical motion parallel to the elongated stock when the feeler means engages the top of the stock.

2. In a flame cutting machine for transversely severing elongated stock advancing in a longitudinal direction in a predetermined path, comprising running gear means movable along the predetermined path, drive means operable to move the running gear means along the path, a vertically reciprocable torch-guiding beam extending across the path and carried by the running gear means for movement in unison therewith along the path, torch means carried by, and transversely movable along, the beam to perform a transverse cut through the stock upon vertical downward reciprocation of the beam, and control means for controlling the drive means so as to move the running gear means in the longitudinal direction of the advancement of the stock and in synchronism therewith, the control means comprising a feeler means carried by the beam for free movement in the longitudinal direction and engaging the top of the stock upon downward reciprocation of the beam to synchronize the movements of the running gears with the advancement of the stock, the improvement of the running gear means comprising first and second running gears spaced transversely of the longitudinal direction, the beam having respective ends respectively carried by the first and second running gears, the drive means comprising first and second drives operatively connected to the first and second running gears respectively, the drives being operable to move the running gears respectively connected therewith in the longitudinal direction, the feeler means being mounted on the beam for free movement in a direction transverse to the longitudinal direction and comprising first and second feelers respectively arranged to engage the top of the stock at points spaced transversely of the path, the first feeler being arranged to control the first drive and the second feeler being arranged to control the second drive, and a positive parallel motion guide supporting the beam and feeler means for common vertical motion parallel to the elongated stock when the feeler means engages the top of the stock.

3. In a flame cutting machine for transversely severing elongated stock advancing in a longitudinal direction in a predetermined path, comprising running gear means movable along the predetermined path, drive means operable to move the running gear means along the path, a vertically reciprocable torch-guiding beam extending across the path and carried by the running gear means for movement in unison therewith along the path, torch means carried by, and transversely movable along, the beam to perform a transverse cut through the stock upon vertical downward reciprocation of the beam, and control means for controlling the drive means so as to move the running gear means in the longitudinal direction of the advancement of the stock and in synchronism therewith, the control means comprising a feeler means carried by the beam for free movement in the longitudinal direction and engaging the top of the stock upon downward reciprocation of the beam to synchronize the movements of the running gears with the advancement of the stock, the improvement of the running gear means comprising first and second running gears spaced transversely of the longitudinal direction, a parallel motion linkage interconnecting the first and second running gears, the feeler means being mounted on the beam for free movement in a direction transverse to the longitudinal direction, and a positive parallel motion guide supporting the beam and feeler means for common vertical motion parallel to the elongated stock when the feeler means engages the top of the stock.

* * * * *